(12) United States Patent
Wu

(10) Patent No.: US 12,532,363 B2
(45) Date of Patent: Jan. 20, 2026

(54) SERVICE COLLISION HANDLING METHOD AND APPARATUS, AND TERMINAL

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 401 days.

(21) Appl. No.: 18/167,384

(22) Filed: Feb. 10, 2023

(65) Prior Publication Data
US 2023/0189352 A1 Jun. 15, 2023

Related U.S. Application Data

(63) Continuation of application No. PCT/CN2021/112187, filed on Aug. 12, 2021.

(30) Foreign Application Priority Data
Aug. 12, 2020 (CN) .......................... 202010809435.6

(51) Int. Cl.
*H04W 74/0833* (2024.01)
*H04W 74/08* (2009.01)
*H04W 76/10* (2018.01)

(52) U.S. Cl.
CPC ... *H04W 74/0841* (2013.01); *H04W 74/0866* (2013.01); *H04W 76/10* (2018.02)

(58) Field of Classification Search
CPC .......... H04W 74/0841; H04W 74/0866; H04W 76/10; H04W 76/50; H04W 24/02; H04W 74/0875
See application file for complete search history.

(56) References Cited

U.S. PATENT DOCUMENTS 11,323,977 B2 5/2022 Jiang
2002/0025816 A1* 2/2002 Johansson ........... H04W 36/185
455/442

(Continued)

FOREIGN PATENT DOCUMENTS

CN 102457976 A 5/2012
CN 109451846 A 3/2019

(Continued)

OTHER PUBLICATIONS

Huawei et al., "Addition of new NR TC 11.3.1-UAC AI0-MTSI MO speech call-SMSoIP-Uplink User data transfer" 3GPP TSG-RAN5 Meeting #87-e, R5-202668, May 2020.

(Continued)

*Primary Examiner* — Kan Yuen
(74) *Attorney, Agent, or Firm* — The Webb Law Firm

(57) ABSTRACT

A service collision handling method includes: in a case that multiple services of different types are initiating connection setup, determining, by a terminal, a connection setup mode according to a first rule, where the first rule is configured by a network-side device or defined by a protocol, and the first rule includes at least one of the following: using a connection setup cause value of a first specified service as a cause value of the connection setup mode; or using a connection setup procedure corresponding to a second specified service.

17 Claims, 2 Drawing Sheets

In a case that multiple services of different classes are initiating connection setup, a terminal determines a connection setup mode according to a first rule, where the first rule is configured by a network-side device or defined by a protocol, and the first rule includes at least one of the following: using a connection setup cause value of a first specified service as a cause value of the connection setup mode; and using a connection setup procedure corresponding to a second specified service

101

(56) References Cited

U.S. PATENT DOCUMENTS

| | | | |
|---|---|---|---|
| 2008/0132259 A1* | 6/2008 | Vin | H04W 4/12 |
| | | | 455/466 |
| 2009/0196219 A1* | 8/2009 | Chin | H04L 12/42 |
| | | | 370/450 |
| 2010/0099402 A1* | 4/2010 | Wu | H04W 76/18 |
| | | | 455/423 |
| 2011/0164619 A1* | 7/2011 | Wang | H04W 4/90 |
| | | | 370/392 |
| 2012/0026973 A1* | 2/2012 | Bontu | H04W 36/02 |
| | | | 370/331 |
| 2012/0115417 A1* | 5/2012 | Moring | H04W 48/20 |
| | | | 455/41.2 |
| 2015/0215216 A1 | 7/2015 | Ekici et al. | |
| 2017/0223752 A1 | 8/2017 | Jung et al. | |
| 2018/0027479 A1 | 1/2018 | Ahmad et al. | |
| 2019/0373664 A1 | 12/2019 | Yuan et al. | |
| 2020/0059982 A1* | 2/2020 | Li | H04W 76/14 |
| 2021/0352739 A1 | 11/2021 | Wu et al. | |
| 2022/0046743 A1* | 2/2022 | Fukuta | H04W 52/383 |
| 2024/0129942 A1* | 4/2024 | Xiong | H04L 5/1469 |

FOREIGN PATENT DOCUMENTS

| | | |
|---|---|---|
| JP | 2020508626 A | 3/2020 |
| WO | 2017171251 A1 | 10/2017 |
| WO | 2019098118 A1 | 5/2019 |
| WO | 2019160475 A1 | 8/2019 |
| WO | 2020151708 A1 | 7/2020 |

OTHER PUBLICATIONS

Vivo, "General Considerations on Small Data Transmission", 3GPP TSG-RAN WG2 Meeting #111, R2-2006550, Aug. 2020.

* cited by examiner

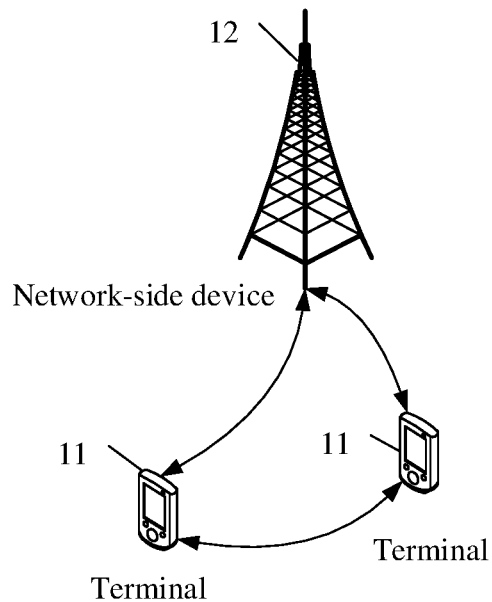

FIG. 1

In a case that multiple services of different classes are initiating connection setup, a terminal determines a connection setup mode according to a first rule, where the first rule is configured by a network-side device or defined by a protocol, and the first rule includes at least one of the following: using a connection setup cause value of a first specified service as a cause value of the connection setup mode; and using a connection setup procedure corresponding to a second specified service

SERVICE COLLISION HANDLING METHOD AND APPARATUS, AND TERMINAL

CROSS-REFERENCE TO RELATED APPLICATIONS

This application is a Bypass Continuation Application of PCT/CN2021/112187 filed on Aug. 12, 2021, which claims priority to Chinese Patent Application No. 202010809435.6 filed on Aug. 12, 2020, the disclosures of which are hereby incorporated by reference in their entireties.

BACKGROUND OF THE INVENTION

Field of the Invention

This disclosure relates to the field of communications technologies, and in particular, to a service collision handling method and apparatus and a terminal.

Description of Related Art

In the related art, when multiple services are initiating connection setup, which service is used by a terminal to initiate connection setup is a problem to be solved.

SUMMARY OF THE INVENTION

According to a first aspect, an embodiment of this disclosure provides a service collision handling method, where the method includes:
  in a case that multiple services of different types are initiating connection setup, determining, by a terminal, a connection setup mode according to a first rule, where the first rule is configured by a network-side device or defined by a protocol, and the first rule includes at least one of the following:
  using a connection setup cause value of a first specified service as a cause value of the connection setup mode; or
  using a connection setup procedure corresponding to a second specified service.

According to a second aspect, an embodiment of this disclosure provides a service collision handling apparatus, where the apparatus includes:
  a handling module, configured to, in a case that multiple services of different types are initiating connection setup, determine a connection setup mode according to a first rule, where the first rule is configured by a network-side device or defined by a protocol, and the first rule includes at least one of the following:
  using a connection setup cause value of a first specified service as a cause value of the connection setup mode; or
  using a connection setup procedure corresponding to a second specified service.

According to a third aspect, an embodiment of this disclosure provides a terminal, where the terminal includes a processor, a memory, and a program or instructions stored in the memory and executable on the processor, and when the program or the instructions are executed by the processor, the steps of the foregoing method are implemented.

According to a fourth aspect, an embodiment of this disclosure provides a non-transitory readable storage medium, where the non-transitory readable storage medium stores a program or instructions, and when the program or the instructions are executed by a processor, the steps of the foregoing method are implemented.

According to a fifth aspect, an embodiment of this disclosure provides a chip, where the chip includes a processor and a communications interface, the communications interface is coupled to the processor, and the processor is configured to execute a program or instructions so as to implement the method according to the first aspect.

According to a sixth aspect, an embodiment of this disclosure provides a computer software product, where the computer software product is stored in a non-volatile storage medium, and the software product is configured to be executed by at least one processor so as to implement the steps of the method according to the first aspect.

According to a seventh aspect, an embodiment of this disclosure provides a terminal, where the terminal is configured to execute the method according to the first aspect.

BRIEF DESCRIPTION OF THE DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may still derive other drawings from these accompanying drawings.

FIG. 1 is a schematic diagram of a wireless communications system;

FIG. 2 is a schematic flowchart of a service collision handling method according to an embodiment of this disclosure;

DESCRIPTION OF THE INVENTION

Figure 3:
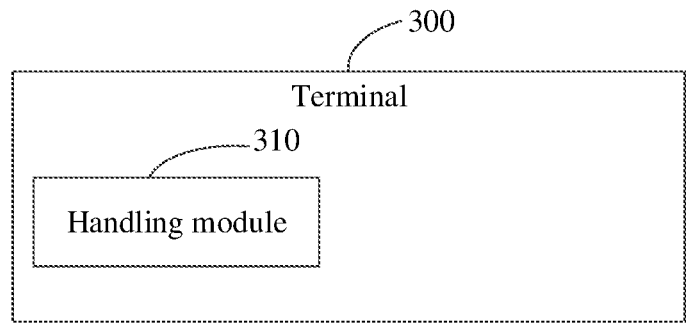
FIG. 3 is a schematic diagram of a structure of a service collision handling apparatus according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by persons of ordinary skill in the art based on the embodiments of this disclosure shall fall within the protection scope of this disclosure.

The terms "first", "second", and the like in this specification and claims of this disclosure are used to distinguish between similar objects rather than to describe a specific order or sequence. It should be understood that the data used in this way is interchangeable in appropriate circumstances such that the embodiments of this disclosure can be implemented in other orders than the order illustrated or described herein. In addition, "and/or" in the specification and claims represents at least one of connected objects, and the character "/" generally indicates that the associated objects have an "or" relationship.

The technologies described herein are not limited to long term evolution (LTE)/LTE-Advanced (LTE-A) systems, but may also be used in various wireless communications systems, such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" are usually used interchangeably. The CDMA system may implement radio technologies such as CDMA2000 and universal terrestrial radio access (UTRA). UTRA includes wideband CDMA (WCDMA) and other CDMA variants. A TDMA system may implement radio technologies such as the global system for mobile communications (GSM). The OFDMA system can implement radio technologies such as ultra mobile broadband (UMB), evolved UTRA (Evolution-UTRA, E-UTRA), IEEE 802.11 (Wi-Fi), IEEE 802.16 (WiMAX), IEEE 802.20, and Flash-OFDM. UTRA and E-UTRA are parts of the universal mobile telecommunications system (UMTS). LTE and more advanced LTE (for example, LTE-A) are new UMTS releases using E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies. However, in the following descriptions, a new radio (NR) system is described for illustrative purposes, and NR terms are used in most of the following descriptions, although these technologies may also be applied to other applications than the NR system application.

Examples provided in the following description are not intended to limit the scope, applicability, or configuration described in the claims. Functions and arrangements of discussed elements may be changed without departing from the spirit and scope of this disclosure. Various examples may be omitted or replaced or various procedures or components may be added, as appropriate. For example, the described method may be performed in an order different from the order described, and steps may be added, omitted, or combined. In addition, features described with reference to some examples may be combined in other examples.

Refer to FIG. 1. FIG. 1 is a block diagram of a wireless communications system to which embodiments of this disclosure may be applied. The wireless communications system includes a terminal 11 and a network-side device 12. The terminal 11 may also be referred to as a terminal device or user equipment (UE). The terminal 11 may be a terminal side device such as a mobile phone, a tablet personal computer, a laptop computer, a personal digital assistant (PDA), a mobile internet device (MID), a wearable device, or an in-vehicle device. It should be noted that the terminal 11 is not limited to any type in the embodiments of this disclosure. The network-side device 12 may be a base station or a core network, where the base station may be a base station of 5G ($5^{th}$ Generation) or a later release (for example, gNB or 5G NR NB), or a base station in other communications systems (for example, eNB, WLAN (wireless local area network) access point, or other access points), or a location server (for example, E-SMLC (Evolved Serving Mobile Location Centre) or LMF (Location Manager Function)). The base station may be referred to as a NodeB, an evolved NodeB, an access point, a base transceiver station (BTS), a radio base station, a radio transceiver, a basic service set (BSS), an extended service set (ESS), a Node B, an evolved node B (evolved Node B, eNB), a home NodeB, a home evolved NodeB, a WLAN access point, a wireless fidelity (Wi-Fi) node, or other appropriate terms in the art in discussion. As long as the same technical effect is achieved, the base station is not limited to any technical term. It should be noted that only the base station in the NR system is taken as an example in the embodiments of this disclosure, but the type of base station and communications system are not limited in the embodiments of this disclosure.

In the related art, when a UE service capable of triggering a direct data transmission procedure has data arriving, the UE is possibly also having other services with arriving data which require a connection resume procedure. In this case, which service is used by the UE to initiate connection setup so as to allow faster setup of connection for a higher-priority service is a problem that needs to be solved.

An embodiment of this disclosure provides a service collision handling method. As shown in FIG. 2, the method includes the following steps.

Step 101: in a case that multiple services of different types are initiating connection setup, a terminal determines a connection setup mode according to a first rule, where the first rule is configured by a network-side device or defined by a protocol, and the first rule includes at least one of the following:

using a connection setup cause value of a first specified service as a cause value of the connection setup mode; or using a connection setup procedure corresponding to a second specified service.

In this embodiment of this disclosure, when multiple services of different types are initiating connection setup, the terminal can determine the connection mode according to the first rule configured by the network-side device or defined by a protocol. For example, the terminal can use a connection setup procedure corresponding to a higher-priority service to perform connection setup, thus allowing faster setup of a connection for the higher-priority service, and reducing service connection setup latency or service data transmission latency.

The connection setup includes initial connection setup and connection resume after the initial connection setup, meaning that the connection setup mode actually includes an initial connection setup mode and a connection resume mode.

In some embodiments, the first specified service and/or the second specified service is a highest-priority service in the multiple services of different types. In this way, the terminal can use a connection setup procedure corresponding to the higher-priority service and/or a connection setup cause value of the higher-priority service, thus allowing faster setup of a connection for the higher-priority service, and reducing service connection setup latency or service data transmission latency.

It should be noted that for small data transmission (Small Data Transmission, SDT), according to resources configured by the network-side device, when the UE is in an idle state or inactive state, the UE may directly transmit data to the network side in the following ways:

(1) via Msg3 of a 4-step random access procedure for initial access;

(2) via MsgA of a 2-step random access procedure for initial access; and (3) via a dedicated physical uplink shared channel (PUSCH) resource configured by the network-side device, including pre-configured PUSCH; or via a pre-allocated uplink resource (PUR).

In addition, the network side may directly transmit data to the UE in the following ways:

(1) via Msg4 of a 4-step random access procedure for initial access;

(2) via MsgB of a 2-step random access procedure for initial access; and (3) via a downlink feedback resource corresponding to a dedicated uplink resource configured by the network-side device.

Before the connection is set up, the terminal may receive hold-configuration-context indication information transmitted by the network-side device, where the indication information indicates that the UE holds its context configuration, for example, data radio bearer (data radio bearer, DRB) configuration and security configuration. The context configuration is used for the UE to resume connection and/or resume data transmission/reception. For example, the network-side device transmits suspend indication information in a radio resource control (RRC) release message, and when the UE is released from the connected state to the idle or inactive state, the UE can use the context configuration to resume connection and/or resume data transmission/reception.

In some embodiments, the method further includes:
obtaining, by the terminal, configuration information for a direct data transfer mode, where the configuration information is configured by the network-side device or defined by a protocol, and the configuration information includes at least one of the following:
a procedure of direct data transfer; or
service indication information for using direct data transfer.

In some embodiments, the procedure of direct data transfer includes at least one of the following:
a direct data transmission procedure, for example, uplink data transmission; or
a direct data reception procedure, for example, downlink data reception.

In some embodiments, the direct data transmission procedure includes at least one of the following:
transmitting data in Msg3 of a 4-step random access procedure;
transmitting data in MsgA of a 2-step random access procedure; or
transmitting data on a dedicated physical uplink shared channel resource configured by the network-side device.

In some embodiments, the direct data reception procedure includes at least one of the following:
receiving data in Msg4 of a 4-step random access procedure;
receiving data in MsgB of a 2-step random access procedure; or
receiving data on a downlink resource corresponding to a dedicated uplink resource configured by the network-side device; for example, after the UE transmits DRB data or a signaling radio bearer (SRB) request message on a dedicated PUSCH resource, the UE monitors physical downlink control channel (PDCCH) resources for a UE-particular identifier (for example, x-radio network temporary identity (RNTI) so as to obtain physical downlink shared channel (PDSCH) scheduling information, where the PDSCH includes DRB downlink data received by the UE.

In some embodiments, the service indication information for using the direct data transfer includes at least one of the following:
a bearer type for using direct data transfer;
a bearer identifier for using direct data transfer;
a service access category for using direct data transfer, for example, access category-1;
a service access class for using direct data transfer, for example, access class-1; or
a service type for using direct data transfer.

In some embodiments, the bearer type for using direct data transfer includes at least one of the following:
master cell group (MCG) DRB;
secondary cell group (SCG) DRB;
MCG split DRB; or
SCG Split DRB.

The MCG split DRB means that the bearer has its packet data convergence protocol (PDCP) on MCG, and two radio link layer control protocols (RLC) sublayers on MCG and SCG respectively; the SCG split DRB means that the bearer has its PDCP on SCG, and two RLC sublayers on MCG and SCG respectively.

In some embodiments, the bearer identifier for using the direct data transfer includes at least one of the following:
a DRB identifier;
a quality of service flow (QoS flow) identifier;
a protocol data unit (PDU) session identifier; or
a cell group identifier, for example, MCG identifier or SCG identifier.

In related art, a connection resume procedure for an inactive UE is triggered by the following services:
an emergency service;
a high priority access service;
a mobile terminated access (mt-Access) service;
a mobile originated signaling (mo-Signalling) service;
a mobile originated data (mo-Data) service;
a mobile originated voice call (mo-VoiceCall) service;
a mobile originated video call (mo-VideoCall) service;
a mobile originated short message (mo-SMS) service;
a access network paging area update (ma-Update) service;
a multimedia priority access (mps-PriorityAccess) service; or
a multimedia emergency access (mcs-PriorityAccess) service.

In some embodiments, the service type for using the direct data transfer also includes at least one of the following:
an emergency service;
a high priority access service;
a mobile terminated access (mt-Access) service;
a mobile originated signaling (mo-Signalling) service;
a mobile originated data (mo-Data) service;
a mobile originated voice call (mo-VoiceCall) service;
a mobile originated video call (mo-VideoCall) service;
a mobile originated short message (mo-SMS) service;
an access network paging area update (ma-Update) service;
a multimedia priority access (mps-PriorityAccess) service; or
a multimedia emergency access (mcs-PriorityAccess) service.

In the embodiments of this disclosure, according to the configuration information obtained above for the direct data transfer mode, when a service corresponding to service data to be transmitted or received by the UE corresponds to the "service indication information for using direct data transfer", and when the data transmission satisfies a "trigger condition for a direct data reception or transmission procedure", the UE uses the "direct data reception or transmission procedure" to transmit or receive the corresponding service data. For example, a service type of uplink data arriving at the UE is service access category-1 (or DRB-1), and access category-1 (or DRB-1) supports direct data transmission. A trigger condition for a direct data reception or transmission procedure as configured by the network side is that a data size is less than a threshold of 50 bytes, and a size of the uplink data is 10 bytes, which is less than the data size threshold of 50 bytes for triggering direct data transmission. In this case, the UE uses the "direct data transmission procedure" to transmit the corresponding service data.

In some embodiments, the connection setup cause value includes at least one of the following:
an emergency;
a high priority access;
a mobile terminated access (mt-Access);
a mobile originated signaling (mo-Signalling);
a mobile originated data (mo-Data);
a mobile originated voice call (mo-VoiceCall);
a mobile originated video call (mo-VideoCall);
a mobile originated short message (mo-SMS);
an access network paging area update (ma-Update);
a multimedia priority access (mps-PriorityAccess); or
a multimedia emergency access (mcs-PriorityAccess).

In some embodiments, the first specified service and/or the second specified service is a highest-priority service in the multiple services of different types. In this way, the terminal can determine the connection setup mode according to the highest-priority service, allowing faster setup of a connection for the highest-priority service, thereby reducing service connection setup latency or service data transmission latency.

In a case that the connection setup cause value of the first specified service is used as the cause value of the connection setup mode, in a example, as specified by the protocol, "mobile terminated service" has a higher priority than "mobile originated service", and therefore, when the UE has both a "mobile terminated service" indicated by paging and a "mobile originated service" capable of triggering direct data transmission, the UE uses the "mobile terminated service" as a cause value for connection resume. For example, the UE may set resumeCause to "mt-Access". In this way, the terminal can determine the connection setup mode using the connection setup cause value of the higher-priority service, thus allowing faster setup of a connection for the higher-priority service, reducing service connection setup latency or service data transmission latency.

In some embodiments, a connection setup cause value of the first specified service is the same as or different from a service type corresponding to service data actually transferred. For example, in a connection resume procedure, the UE may use the direct data transmission mode to transmit DRB-1 data, where the data corresponds to "mobile originated service". However, because the UE also has a "mobile terminated service", and the protocol specifies that "mobile terminated service" has a higher priority, resumeCause may be set to the connection setup cause value of "mobile terminated service", that is, to "mt-Access".

In a case that the connection setup procedure corresponding to the second specified service is used as the connection setup mode, in a example, as specified by the protocol, "mobile terminated service" has a higher priority than "mobile originated service", and therefore, in a case that the UE has both a "mobile terminated service" indicated by paging and a "mobile originated service" capable of triggering direct data transmission, as only a normal connection resume procedure can be used for the "mobile terminated service" indicated by paging (rather than the direct data transmission or reception procedure), the UE uses the "normal connection resume procedure". In another example, as specified by the protocol, "emergency service" has a higher priority than "mobile originated data service", and therefore, in a case that the UE has both an "emergency service" and a "mobile originated service" capable of triggering direct data transmission, because only a normal connection resume procedure can be used for the "emergency service" (rather than the direct data transmission or reception procedure), the UE uses the "normal connection resume procedure". With the foregoing solution, the terminal can perform connection setup according to a connection setup procedure corresponding to the higher-priority service, thus allowing faster setup of a connection for the higher-priority service, reducing service connection setup latency or service data transmission latency.

In some embodiments, the connection setup procedure includes at least one of the following:
a direct data transmission procedure;
a direct data reception procedure; or
a first connection setup procedure, where only radio resource control signaling is transmitted in the first connection setup procedure, meaning a normal connection setup procedure; for example, in an initial access procedure, DRB data is not directly transmitted and only RRC control signaling (for example, RRCResumeRequest message) is transmitted.

In some embodiments, a priority ordering rule for services includes any one of the following:
an emergency service having a higher priority than a mobile originated data service;
a high-priority access service having a higher priority than the mobile originated data service;
a service that triggers a first connection setup procedure having a higher priority than a service that triggers a procedure of direct data transfer, wherein in the first connection setup procedure, no data is transmitted and only radio resource control signaling is transmitted;
the service that triggers the first connection setup procedure having a lower priority than the service that triggers the procedure of direct data transfer;
a mobile terminated service having a higher priority than a mobile originated service;
a service that triggers a direct data transmission procedure having a higher priority than a service that triggers a direct data reception procedure;
the service that triggers the direct data transmission procedure having a lower priority than the service that triggers the direct data reception procedure;
a paging area update service having a higher priority than the service that triggers a procedure of direct data transfer;
the paging area update service having a lower priority than the service that triggers the procedure of direct data transfer;
the paging area update service having a higher priority than the mobile originated service;
the paging area update service having a lower priority than the mobile originated service;
the paging area update service having a higher priority than the mobile terminated service; and
the paging area update service having a lower priority than the mobile terminated service.

It should be noted that the service collision handling method provided in the embodiments of this disclosure may be executed by a service collision handling apparatus or a module in the service collision handling apparatus for executing a loaded service collision handling method. In the embodiments of this disclosure, the service collision handling method according to the embodiments of this disclosure is described with a service collision handling apparatus for executing a loaded a service collision handling method used as an example.

An embodiment of this disclosure provides a service collision handling apparatus. As shown in FIG. 3, the apparatus 300 includes:
- a handling module 310, configured to, in a case that multiple services of different types are initiating connection setup, determine a connection setup mode according to a first rule, where the first rule is configured by a network-side device or defined by a protocol, and the first rule includes at least one of the following:
- using a connection setup cause value of a first specified service as a cause value of the connection setup mode; or
- using a connection setup procedure corresponding to a second specified service.

In this embodiment of this disclosure, when multiple services of different types are initiating connection setup, a terminal may determine a connection mode according to a first rule configured by the network-side device or defined by a protocol. For example, the terminal may use a connection setup procedure corresponding to a higher-priority service to perform connection setup, such that a connection can be set up faster for the higher-priority service, thereby reducing service connection setup latency or service data transmission latency.

The connection setup includes initial connection setup and connection resume after the initial connection setup, meaning that the connection setup mode actually includes an initial connection setup mode and a connection resume mode.

In some embodiments, the apparatus further includes:
- an obtaining module, configured to obtain configuration information for a direct data transfer mode, where the configuration information is configured by the network-side device or defined by a protocol, and the configuration information includes at least one of the following:
- a procedure of direct data transfer; or
- service indication information for using direct data transfer.

In some embodiments, the procedure of direct data transfer includes at least one of the following:
- a direct data transmission procedure; or
- a direct data reception procedure.

In some embodiments, the direct data transmission procedure includes at least one of the following:
- transmitting data in Msg3 of a 4-step random access procedure;
- transmitting data in MsgA of a 2-step random access procedure; or
- transmitting data on a dedicated physical uplink shared channel resource configured by the network-side device.

In some embodiments, the direct data reception procedure includes at least one of the following:
- receiving data in Msg4 of a 4-step random access procedure;
- receiving data in MsgB of a 2-step random access procedure; or
- receiving data on a downlink resource corresponding to a dedicated uplink resource configured by the network-side device; for example, after the UE transmits DRB data or a signaling radio bearer (SRB) request message on a dedicated PUSCH resource, the UE monitors physical downlink control channel (PDCCH) resources for a UE-particular identifier (for example, x-radio network temporary identity (RNTI) so as to obtain physical downlink shared channel (PDSCH) scheduling information, where the PDSCH includes DRB downlink data received by the UE.

In some embodiments, the service indication information for using the direct data transfer includes at least one of the following:
- a bearer type for using direct data transfer;
- a bearer identifier for using direct data transfer;
- a service access category for using direct data transfer, for example, access category-1;
- a service access class for using direct data transfer, for example, access class-1; or
- a service type for using direct data transfer.

In some embodiments, the bearer type for using direct data transfer includes at least one of the following:
- MCG DRB;
- SCG DRB;
- MCG Split DRB; or
- SCG Split DRB.

The MCG split DRB means that the bearer has its packet data convergence protocol (Packet Data Convergence Protocol, PDCP) on MCG, and two radio link layer control protocols (Radio Link Control, RLC) sublayers on MCG and SCG respectively; the SCG split DRB means that the bearer has its PDCP on SCG, and two RLC sublayers on MCG and SCG respectively.

In some embodiments, the bearer identifier for using the direct data transfer includes at least one of the following:
- a DRB identifier;
- a QoS flow identifier;
- a PDU session identifier; or
- a cell group identifier.

In some embodiments, the service type for using the direct data transfer includes at least one of the following:
- an emergency service;
- a high priority access service;
- a mobile terminated access (mt-Access) service;
- a mobile originated signaling (mo-Signalling) service;
- a mobile originated data (mo-Data) service;
- a mobile originated voice call (mo-VoiceCall) service;
- a mobile originated video call (mo-VideoCall) service;
- a mobile originated short message (mo-SMS) service;
- an access network paging area update (ma-Update) service;
- a multimedia priority access (mps-PriorityAccess) service; or
- a multimedia emergency access (mcs-PriorityAccess) service.

In this embodiment of this disclosure, according to the configuration information obtained above for the direct data transfer mode, when a service corresponding to service data to be transmitted or received by the UE corresponds to the "service indication information for using direct data transfer", and when the data transmission satisfies a "trigger condition for a direct data reception or transmission procedure", the UE uses the "direct data reception or transmission procedure" to transmit or receive the corresponding service data. For example, a service type of uplink data arriving at the UE is service access category-1 (or DRB-1), and access category-1 (or DRB-1) supports direct data transmission. A trigger condition for a direct data reception or transmission procedure as configured by the network side is that a data size is less than a threshold of 50 bytes, and a size of the uplink data is 10 bytes, which is less than the data size threshold of 50 bytes for triggering direct data transmission. In this case, the UE uses the "direct data transmission procedure" to transmit the corresponding service data.

In some embodiments, the connection setup cause value includes at least one of the following:
- an emergency;
- a high priority access;
- a mobile terminated access (mt-Access);
- a mobile originated signaling (mo-Signalling);
- a mobile originated data (mo-Data);
- a mobile originated voice call (mo-VoiceCall);
- a mobile originated video call (mo-VideoCall);
- a mobile originated short message (mo-SMS);
- an access network paging area update (ma-Update);
- a multimedia priority access (mps-PriorityAccess); or
- a multimedia emergency access (mcs-PriorityAccess).

When the connection setup cause value of the first specified service is used as the cause value of the connection setup mode, in a example, as specified in the protocol, "mobile terminated service" has a higher priority than "mobile originated service". Therefore, when the UE has both a "mobile terminated service" indicated by paging and a "mobile originated service" capable of triggering direct data transmission, the UE uses the "mobile terminated service" as the cause value of connection resume. For example, the UE may set resumeCause to "mt-Access". In this way, the terminal can determine the connection setup mode using a connection setup cause value of the higher-priority service, thus allowing faster setup of a connection for the higher-priority service, reducing service connection setup latency or service data transmission latency.

In some embodiments, a connection setup cause value of the first specified service is the same as or different from a service type corresponding to service data actually transferred. For example, in a connection resume procedure, the UE may use the direct data transmission mode to transmit DRB-1 data, where the data corresponds to "mobile originated service". However, because the UE also has a "mobile terminated service", and the protocol specifies that "mobile terminated service" has a higher priority, resumeCause may be set to the connection setup cause value of "mobile terminated service", that is, to "mt-Access".

When the connection setup procedure corresponding to the second specified service is used as the connection setup mode, in a example, as specified by the protocol, "mobile terminated service" has a higher priority than "mobile originated service", and therefore, when the UE has both a "mobile terminated service" indicated by paging and a "mobile originated service" capable of triggering direct data transmission, as only a normal connection resume procedure can be used for the "mobile terminated service" indicated by paging (rather than the direct data transmission or reception procedure), the UE uses the "normal connection resume procedure". In another example, as specified by the protocol, "emergency service" has a higher priority than "mobile originated data service", and therefore, when the UE has both an "emergency service" and a "mobile originated service" capable of triggering direct data transmission, because only a normal connection resume procedure can be used for the "emergency service" (rather than the direct data transmission or reception procedure), the UE uses the "normal connection resume procedure". With the foregoing solution, the terminal can perform connection setup according to a connection setup procedure corresponding to the higher-priority service, thus allowing faster setup of a connection for the higher-priority service, reducing service connection setup latency or service data transmission latency.

In some embodiments, the connection setup procedure includes at least one of the following:
- a direct data transmission procedure;
- a direct data reception procedure; or
- a first connection setup procedure, where only radio resource control signaling is transmitted in the first connection setup procedure, meaning a normal connection setup procedure; for example, in an initial access procedure, DRB data is not directly transmitted and only RRC control signaling (for example, RRCResumeRequest message) is transmitted.

In some embodiments, the first specified service and/or the second specified service is a highest-priority service in the multiple services of different types.

In some embodiments, a priority ordering rule for services includes any one of the following:
- an emergency service having a higher priority than a mobile originated data service;
- a high-priority access service having a higher priority than the mobile originated data service;
- a service that triggers a first connection setup procedure having a higher priority than a service that triggers a procedure of direct data transfer, wherein in the first connection setup procedure, no data is transmitted and only radio resource control signaling is transmitted;
- the service that triggers the first connection setup procedure having a lower priority than the service that triggers the procedure of direct data transfer;
- a mobile terminated service having a higher priority than a mobile originated service;
- a service that triggers a direct data transmission procedure having a higher priority than a service that triggers a direct data reception procedure;
- the service that triggers the direct data transmission procedure having a lower priority than the service that triggers the direct data reception procedure;
- a paging area update service having a higher priority than the service that triggers a procedure of direct data transfer;
- the paging area update service having a lower priority than the service that triggers the procedure of direct data transfer;
- the paging area update service having a higher priority than the mobile originated service;
- the paging area update service having a lower priority than the mobile originated service;
- the paging area update service having a higher priority than the mobile terminated service; and
- the paging area update service having a lower priority than the mobile terminated service.

The service collision handling apparatus in the embodiments of this disclosure may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a network attached storage (NAS), a personal computer (PC), a television (TV), a teller machine, a self-service machine, or the like. This is not limited in the embodiments of this disclosure.

The service collision handling apparatus in the embodiments of this disclosure may be an apparatus having an operating system. The operating system may be an Android operating system, an iOS operating system, or other possible operating systems. This is not limited in the embodiments of this disclosure.

Optionally, an embodiment of this disclosure further provides a terminal, including a processor, a memory, and a program or instructions stored in the memory and executable on the processor, where when the program or instructions are executed by the processor, the processes of the foregoing service collision handling method embodiment are implemented, with the same technical effects achieved. To avoid repetition, details are not further described herein.

It should be noted that the terminal in this embodiment of this disclosure includes the above-mentioned mobile electronic device and non-mobile electronic device.

Figure 4:
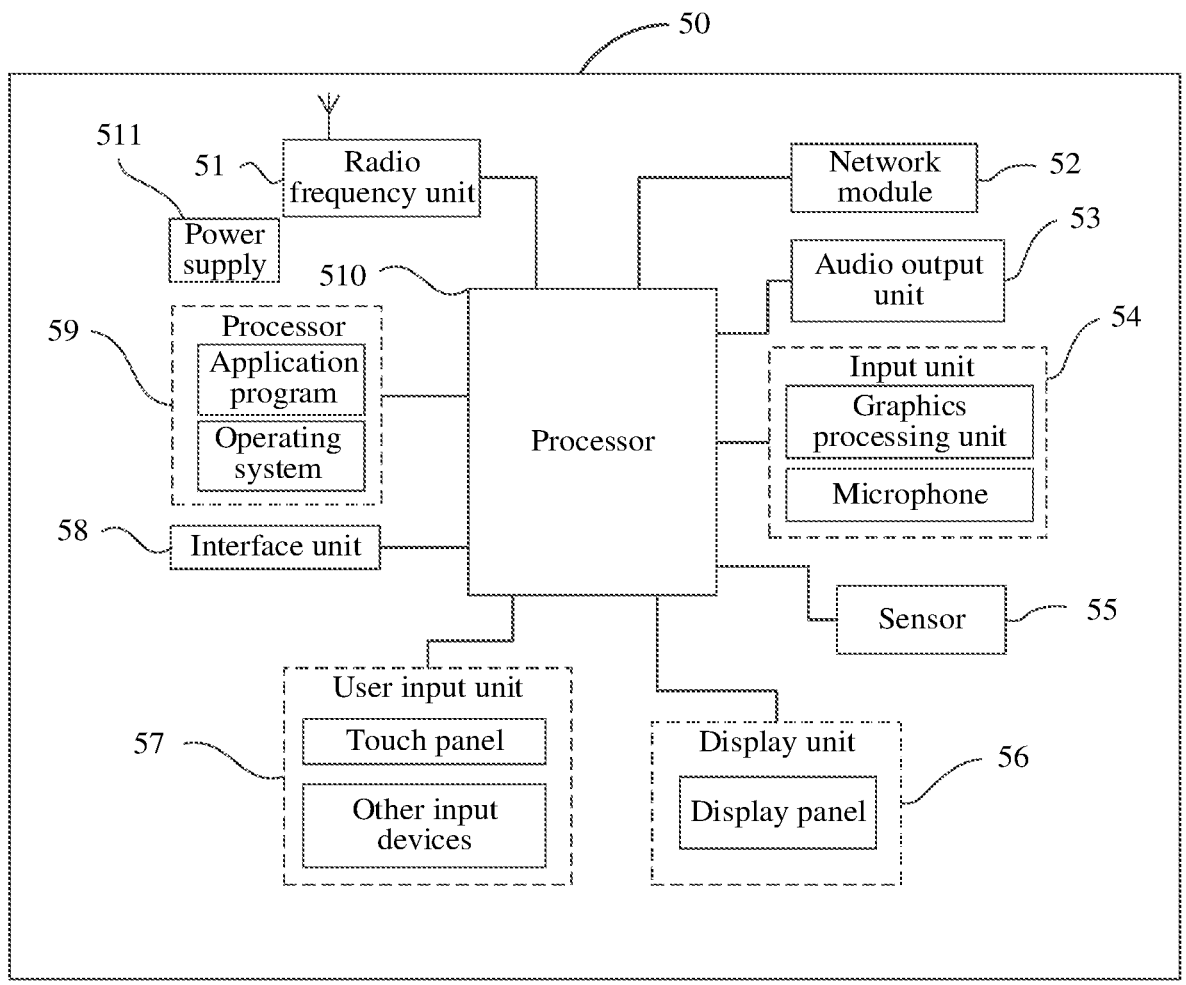
FIG. 4 is a schematic diagram of composition of a terminal according to an embodiment of this disclosure.

FIG. 4 is a schematic diagram of a hardware structure of a terminal for implementing the embodiments of this disclosure. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. Persons skilled in the art can understand that the structure of the terminal shown in FIG. 4 does not constitute any limitation on the terminal, and the terminal may include more or fewer components than shown in the diagram, or combine some of the components, or have different arrangements of the components. In this embodiment of this disclosure, the terminal includes but is not limited to a mobile phone, a tablet computer, a laptop computer, a palmtop computer, a vehicle-mounted mobile terminal, a wearable device, a pedometer, or the like.

It should be understood that in this embodiment of this disclosure, the radio frequency unit 51 may be configured to receive and transmit information, or to receive and transmit a signal in a call process, and specially, after receiving downlink data from a base station, transmit the downlink data to the processor 510 for processing; and also transmit uplink data to the base station. Generally, the radio frequency unit 51 includes but is not limited to an antenna, at least one amplifier, a transceiver, a coupler, a low noise amplifier, a duplexer, and the like. In addition, the radio frequency unit 51 may also communicate with a network and other devices via a wireless communications system.

The memory 59 may be configured to store software programs and various data. The memory 59 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 59 may include a high-speed random access memory, or may further include a non-volatile memory, for example, at least one magnetic disk storage device, flash memory, or other volatile solid-state storage devices.

The processor 510 is a control center of the terminal, and is connected to all components of the terminal by using various interfaces and lines. By executing software programs and/or modules stored in the memory 59 and invoking data stored in the memory 59, the processor 510 executes various functions of the terminal and processes data, so as to perform overall monitoring on the terminal. The processor 510 may include one or more processing units. Illustratively, the processor 510 may integrate an application processor and a modem processor. The application processor mainly processes the operating system, a user interface, an application program, and the like. The modem processor mainly processes wireless communication. It can be understood that the modem processor may alternatively not be integrated in the processor 510.

The terminal 50 may further include the power supply 511 (such as a battery) supplying power to the components. Illustratively, the power supply 511 may be logically connected to the processor 510 via a power management system, so that functions such as charge and discharge management and power consumption management are implemented via the power management system.

In addition, the terminal 50 includes some functional modules that are not shown, which are not further described herein.

The processor 510 is configured to, in a case that multiple services of different types are initiating connection setup, determine a connection setup mode according to a first rule, where the first rule is configured by a network-side device or defined by a protocol, and the first rule includes at least one of the following:

using a connection setup cause value of a first specified service as a cause value of the connection setup mode; or using a connection setup procedure corresponding to a second specified service.

In some embodiments, the processor 510 is further configured to obtain configuration information for a direct data transfer mode, where the configuration information is configured by the network-side device or defined by a protocol, and the configuration information includes at least one of the following:

a procedure of direct data transfer; or service indication information for using direct data transfer.

In some embodiments, the procedure of the direct data transfer includes at least one of the following:

a direct data transmission procedure; or a direct data reception procedure.

In some embodiments, the direct data transmission procedure includes at least one of the following:

transmitting data in Msg3 of a 4-step random access procedure;

transmitting data in MsgA of a 2-step random access procedure; or transmitting data on a dedicated physical uplink shared channel resource configured by the network-side device.

In some embodiments, the direct data reception procedure includes at least one of the following:

receiving data in Msg4 of a 4-step random access procedure;

receiving data in MsgB of a 2-step random access procedure; or receiving data on a downlink resource corresponding to a dedicated uplink resource configured by the network-side device.

In some embodiments, the service indication information for using the direct data transfer includes at least one of the following:

a bearer type for using direct data transfer;

a bearer identifier for using direct data transfer;

a service access category for using direct data transfer;

a service access class for using direct data transfer; or a service type for using direct data transfer.

In some embodiments, the bearer type for using direct data transfer includes at least one of the following:
MCG DRB;
SCG DRB;
MCG Split DRB; or
SCG Split DRB.

In some embodiments, the bearer identifier for using the direct data transfer includes at least one of the following:
a DRB identifier;
a QoS flow identifier;
a PDU session identifier; or
a cell group identifier.

In some embodiments, the service type for using the direct data transfer includes at least one of the following:
an emergency service;
a high priority access service;
a mobile terminated access (mt-Access) service;
a mobile originated signaling (mo-Signalling) service;
a mobile originated data (mo-Data) service;
a mobile originated voice call (mo-VoiceCall) service;
a mobile originated video call (mo-VideoCall) service;
a mobile originated short message (mo-SMS) service;
a access network paging area update (ma-Update) service;
a multimedia priority access (mps-PriorityAccess) service; or
a multimedia emergency access (mcs-PriorityAccess) service.

In some embodiments, the connection setup cause value includes at least one of the following:
an emergency;
a high priority access;
a mobile terminated access (mt-Access);
a mobile originated signaling (mo-Signalling);
a mobile originated data (mo-Data);
a mobile originated voice call (mo-VoiceCall);
a mobile originated video call (mo-VideoCall);
a mobile originated short message (mo-SMS);
an access network paging area update (ma-Update);
a multimedia priority access (mps-PriorityAccess); and
a multimedia emergency access (mcs-PriorityAccess).

In some embodiments, a connection setup cause value the first specified service the same as or different from a service type corresponding to service data actually transferred.

In some embodiments, the connection setup procedure includes at least one of the following:
a direct data transmission procedure;
a direct data reception procedure; or
a first connection setup procedure, in which only radio resource control signaling is transmitted.

In some embodiments, the first specified service and/or the second specified service is a highest-priority service in the multiple services of different types.

In some embodiments, a priority ordering rule for services includes any one of the following:
an emergency service having a higher priority than a mobile originated data service;
a high-priority access service having a higher priority than the mobile originated data service;
a service that triggers a first connection setup procedure having a higher priority than a service that triggers a procedure of direct data transfer, wherein in the first connection setup procedure, no data is transmitted and only radio resource control signaling is transmitted;
the service that triggers the first connection setup procedure having a lower priority than the service that triggers the procedure of direct data transfer;
a mobile terminated service having a higher priority than a mobile originated service;
a service that triggers a direct data transmission procedure having a higher priority than a service that triggers a direct data reception procedure;
the service that triggers the direct data transmission procedure having a lower priority than the service that triggers the direct data reception procedure;
a paging area update service having a higher priority than the service that triggers a procedure of direct data transfer;
the paging area update service having a lower priority than the service that triggers the procedure of direct data transfer;
the paging area update service having a higher priority than the mobile originated service;
the paging area update service having a lower priority than the mobile originated service;
the paging area update service having a higher priority than the mobile terminated service; and
the paging area update service having a lower priority than the mobile terminated service.

An embodiment of this disclosure further provides a non-transitory readable storage medium, where the non-transitory readable storage medium stores a program or instructions, and when the program or instructions are executed by a processor, the processes of the foregoing service collision handling method embodiment are implemented, with the same technical effect achieved. To avoid repetition, details are not described herein again.

The processor is the processor in the terminal described in the foregoing embodiment. The non-transitory readable storage medium includes a non-transitory computer-readable storage medium, such as a computer read-only memory (ROM), a random access memory (RAM), a magnetic disk, or an optical disc.

Another embodiment of this disclosure provides a chip, where the chip includes a processor and a communications interface, the communications interface is coupled to the processor, and the processor is configured to execute a program or instructions to implement the processes of the foregoing service collision handling method embodiment, with the same technical effects achieved. To avoid repetition, details are not described herein again.

It should be understood that the chip in the embodiments of this disclosure may also be referred to as a system-level chip, a system chip, a chip system, a system on chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this disclosure is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

Persons of ordinary skill in the art may realize that units and algorithm steps of various examples described with reference to the embodiments disclosed in this specification can be implemented by using electronic hardware or a combination of computer software and electronic hardware. Whether the functions are performed by hardware or software depends on particular applications and design constraints of the technical solutions. Persons skilled in the art may use a different method for each particular application to implement the described functions, but it should not be considered that such implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this disclosure, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections via some interfaces, apparatuses or units, and may be in electrical, mechanical, or other forms.

The units described as separate parts may or may not be physically separate. Parts displayed as units may or may not be physical units, meaning that they may be located in one place or distributed on a plurality of network elements. Some or all of the units may be selected as appropriate to actual needs to achieve the objectives of the solutions of the embodiments.

In addition, functional units in the embodiments of this disclosure may be integrated into one processing unit, or each of the units may exist alone physically, or two or more units are integrated into one unit.

From the description of the foregoing embodiments, persons skilled in the art can clearly understand that the method in the foregoing embodiments may be implemented by software plus a necessary universal hardware platform or by hardware only. In most cases, the former is a preferred implementation. Based on such an understanding, the technical solutions of this disclosure essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

It can be understood that the embodiments described in the embodiments of this disclosure may be implemented by hardware, software, firmware, middleware, microcode, or a combination thereof. For implementation by hardware, modules, units, and subunits may be implemented in one or more application specific integrated circuits (ASIC), digital signal processors (DSP), digital signal processing devices (DSPD), programmable logic devices (PLD), field-programmable gate array (FPGA), general-purpose processors, controllers, microcontrollers, microprocessors, or other electronic units for implementing the functions described in this disclosure, or a combination thereof.

For software implementation, the techniques described in the embodiments of this disclosure may be implemented by modules (for example, processes or functions) that implement the functions described in the embodiments of this disclosure. Software code may be stored in the memory and executed by the processor. The memory may be implemented in or outside the processor.

The foregoing describes the embodiments of this disclosure with reference to the accompanying drawings. However, this disclosure is not limited to these embodiments. The embodiments are merely illustrative rather than restrictive. Inspired by this disclosure, persons of ordinary skill in the art may develop many other forms without departing from the principle of this disclosure and the protection scope of the claims, and all such forms fall within the protection scope of this disclosure.

What is claimed is:

1. A service collision handling method, comprising:
in a case that there is a collision among multiple services of different types and the multiple services require initiating connection setup, performing, by a terminal, connection setup according to a first rule; wherein
the first rule is configured by a network-side device or defined by a protocol, and the first rule comprises:
using a connection setup cause value of a first specified service as a cause value of the connection setup; wherein
a connection setup cause value of the first specified service is different from a service type corresponding to service data actually transferred; and
the first specified service is a highest-priority service in the multiple services of different types; and
the method further comprises:
obtaining, by the terminal, configuration information for a direct data transfer mode;
wherein
the configuration information is configured by the network-side device or defined by a protocol, and the configuration information comprises at least one of following:
a procedure of direct data transfer; or
service indication information for using direct data transfer.

2. The service collision handling method according to claim 1, wherein the procedure of the direct data transfer comprises at least one of following:
a direct data transmission procedure; or
a direct data reception procedure.

3. The service collision handling method according to claim 2, wherein the direct data transmission procedure comprises at least one of following:
transmitting data in Msg3 of a 4-step random access procedure;
transmitting data in MsgA of a 2-step random access procedure; or
transmitting data on a dedicated physical uplink shared channel resource configured by the network-side device.

4. The service collision handling method according to claim 2, wherein the direct data reception procedure comprises at least one of following:

receiving data in Msg4 of a 4-step random access procedure;

receiving data in MsgB of a 2-step random access procedure; or receiving data on a downlink resource corresponding to a dedicated uplink resource configured by the network-side device.

5. The service collision handling method according to claim 2, wherein the connection setup procedure comprises at least one of following:

a direct data transmission procedure;

a direct data reception procedure; or a first connection setup procedure, in which no data is transmitted and only radio resource control signaling is transmitted.

6. The service collision handling method according to claim 1, wherein the service indication information for using the direct data transfer comprises at least one of following:

a bearer type for using direct data transfer;

a bearer identifier for using direct data transfer;

a service access category for using direct data transfer;

a service access class for using direct data transfer; or a service type for using direct data transfer.

7. The service collision handling method according to claim 1, wherein a priority ordering rule for services comprises any one of following:

an emergency service having a higher priority than a mobile originated data service;

a high-priority access service having a higher priority than the mobile originated data service;

a service that triggers a first connection setup procedure having a higher priority than a service that triggers a procedure of direct data transfer, wherein in the first connection setup procedure, no data is transmitted and only radio resource control signaling is transmitted;

the service that triggers the first connection setup procedure having a lower priority than the service that triggers the procedure of direct data transfer;

a mobile terminated service having a higher priority than a mobile originated service;

a service that triggers a direct data transmission procedure having a higher priority than a service that triggers a direct data reception procedure;

the service that triggers the direct data transmission procedure having a lower priority than the service that triggers the direct data reception procedure;

a paging area update service having a higher priority than the service that triggers a procedure of direct data transfer;

the paging area update service having a lower priority than the service that triggers the procedure of direct data transfer;

the paging area update service having a higher priority than the mobile originated service;

the paging area update service having a lower priority than the mobile originated service;

the paging area update service having a higher priority than the mobile terminated service; and the paging area update service having a lower priority than the mobile terminated service.

8. A terminal, comprising a processor, a memory, and a program or instructions stored in the memory and executable on the processor, wherein the program or the instructions, when executed by the processor, causes the terminal to perform:

in a case that there is a collision among multiple services of different types and the multiple services require initiating connection setup, performing, by a terminal, connection setup according to a first rule; wherein the first rule is configured by a network-side device or defined by a protocol, and the first rule comprises:

using a connection setup cause value of a first specified service as a cause value of the connection setup; wherein a connection setup cause value of the first specified service is different from a service type corresponding to service data actually transferred; and the first specified service is a highest-priority service in the multiple services of different types; and the program or the instructions, when executed by the processor, causes the terminal to further perform:

obtaining configuration information for a direct data transfer mode; wherein the configuration information is configured by the network-side device or defined by a protocol, and the configuration information comprises at least one of following:

a procedure of direct data transfer; or service indication information for using direct data transfer.

9. The terminal according to claim 8, wherein the procedure of the direct data transfer comprises at least one of following:

a direct data transmission procedure; or a direct data reception procedure; and/or the service indication information for using the direct data transfer comprises at least one of following:

a bearer type for using direct data transfer;

a bearer identifier for using direct data transfer;

a service access category for using direct data transfer;

a service access class for using direct data transfer; or a service type for using direct data transfer.

10. The terminal according to claim 9, wherein the direct data transmission procedure comprises at least one of following:

transmitting data in Msg3 of a 4-step random access procedure;

transmitting data in MsgA of a 2-step random access procedure; or transmitting data on a dedicated physical uplink shared channel resource configured by the network-side device; and/or the direct data reception procedure comprises at least one of following:

receiving data in Msg4 of a 4-step random access procedure;

receiving data in MsgB of a 2-step random access procedure; or receiving data on a downlink resource corresponding to a dedicated uplink resource configured by the network-side device.

11. The terminal according to claim 9, wherein the connection setup procedure comprises at least one of following:

a direct data transmission procedure;

a direct data reception procedure; or a first connection setup procedure, in which no data is transmitted and only radio resource control signaling is transmitted.

12. The terminal according to claim 8, wherein a priority ordering rule for services comprises any one of following:

an emergency service having a higher priority than a mobile originated data service;

a high-priority access service having a higher priority than the mobile originated data service;

a service that triggers a first connection setup procedure having a higher priority than a service that triggers a procedure of direct data transfer, wherein in the first connection setup procedure, no data is transmitted and only radio resource control signaling is transmitted;

the service that triggers the first connection setup procedure having a lower priority than the service that triggers the procedure of direct data transfer;

a mobile terminated service having a higher priority than a mobile originated service;

a service that triggers a direct data transmission procedure having a higher priority than a service that triggers a direct data reception procedure;

the service that triggers the direct data transmission procedure having a lower priority than the service that triggers the direct data reception procedure;

a paging area update service having a higher priority than the service that triggers a procedure of direct data transfer;

the paging area update service having a lower priority than the service that triggers the procedure of direct data transfer;

the paging area update service having a higher priority than the mobile originated service;

the paging area update service having a lower priority than the mobile originated service;

the paging area update service having a higher priority than the mobile terminated service; and the paging area update service having a lower priority than the mobile terminated service.

13. A non-transitory readable storage medium, wherein the non-transitory readable storage medium stores a program or instructions, and the program or the instructions, when executed by a processor of a terminal, causes the processor of the terminal to perform:

in a case that there is a collision among multiple services of different types and the multiple services require initiating connection setup, performing, by a terminal, connection setup according to a first rule; wherein the first rule is configured by a network-side device or defined by a protocol, and the first rule comprises:

using a connection setup cause value of a first specified service as a cause value of the connection setup; wherein a connection setup cause value of the first specified service is different from a service type corresponding to service data actually transferred; and the first specified service is a highest-priority service in the multiple services of different types; and the instructions, when executed by a processor of a terminal, causes the processor of the terminal to perform:

obtaining configuration information for a direct data transfer mode; wherein the configuration information is configured by the network-side device or defined by a protocol, and the configuration information comprises at least one of following:

a procedure of direct data transfer; or service indication information for using direct data transfer.

14. The non-transitory readable storage medium according to claim 13, wherein the procedure of the direct data transfer comprises at least one of following:

a direct data transmission procedure; or a direct data reception procedure; and/or the service indication information for using the direct data transfer comprises at least one of following:

a bearer type for using direct data transfer;

a bearer identifier for using direct data transfer;

a service access category for using direct data transfer;

a service access class for using direct data transfer; or a service type for using direct data transfer.

15. The non-transitory readable storage medium according to claim 14, wherein the direct data transmission procedure comprises at least one of following:

transmitting data in Msg3 of a 4-step random access procedure;

transmitting data in MsgA of a 2-step random access procedure; or transmitting data on a dedicated physical uplink shared channel resource configured by the network-side device; and/or the direct data reception procedure comprises at least one of following:

receiving data in Msg4 of a 4-step random access procedure;

receiving data in MsgB of a 2-step random access procedure; or receiving data on a downlink resource corresponding to a dedicated uplink resource configured by the network-side device.

16. The non-transitory readable storage medium according to claim 13, wherein a priority ordering rule for services comprises any one of following:

an emergency service having a higher priority than a mobile originated data service;

a high-priority access service having a higher priority than the mobile originated data service;

a service that triggers a first connection setup procedure having a higher priority than a service that triggers a procedure of direct data transfer, wherein in the first connection setup procedure, no data is transmitted and only radio resource control signaling is transmitted;

the service that triggers the first connection setup procedure having a lower priority than the service that triggers the procedure of direct data transfer;

a mobile terminated service having a higher priority than a mobile originated service;

a service that triggers a direct data transmission procedure having a higher priority than a service that triggers a direct data reception procedure;

the service that triggers the direct data transmission procedure having a lower priority than the service that triggers the direct data reception procedure;

a paging area update service having a higher priority than the service that triggers a procedure of direct data transfer;

the paging area update service having a lower priority than the service that triggers the procedure of direct data transfer;

the paging area update service having a higher priority than the mobile originated service;

the paging area update service having a lower priority than the mobile originated service;

the paging area update service having a higher priority than the mobile terminated service; and the paging area update service having a lower priority than the mobile terminated service.

17. A computer software product, wherein the computer software product is stored in a non-volatile storage medium, and the software product is configured to be executed by at least one processor of a terminal so as to implement steps of
the method according to claim 1.

\* \* \* \* \*